United States Patent
Brown, IV et al.

(10) Patent No.: US 11,708,124 B2
(45) Date of Patent: *Jul. 25, 2023

(54) NON-UNIFORM STEERER TUBE OR FORK LEG

(71) Applicant: Fox Factory, Inc., Duluth, GA (US)

(72) Inventors: William O. Brown, IV, Aptos, CA (US); Daniel McCormick, Santa Cruz, CA (US); Joshua Coaplen, Asheville, NC (US); Christopher Otterness, Asheville, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,085

(22) Filed: Apr. 13, 2022

(65) Prior Publication Data

US 2022/0371682 A1 Nov. 24, 2022

Related U.S. Application Data

(63) Continuation of application No. 16/659,272, filed on Oct. 21, 2019, now Pat. No. 11,305,834.

(60) Provisional application No. 62/751,929, filed on Oct. 29, 2018.

(51) Int. Cl.
B62K 21/02 (2006.01)
(52) U.S. Cl.
CPC ................... B62K 21/02 (2013.01)

(58) Field of Classification Search
CPC ......... B62K 21/18; B62K 21/04; B62K 21/02
USPC ........................................................ 280/280
See application file for complete search history.

(56) References Cited

U.S. PATENT DOCUMENTS

| | | | |
|---|---|---|---|
| 4,531,756 A | 7/1985 | Mori | |
| 6,655,707 B2 | 12/2003 | Buckmiller et al. | |
| 7,296,813 B2 | 11/2007 | Montague et al. | |
| 7,543,835 B2 | 6/2009 | Murphy et al. | |
| 7,614,631 B2 | 11/2009 | Chao | |
| 7,909,346 B2 | 3/2011 | Moechnig | |
| 7,950,681 B2 | 5/2011 | Lewis et al. | |
| 8,083,246 B2 | 12/2011 | White | |
| 8,366,130 B2 | 2/2013 | Galasso et al. | |
| 10,005,512 B2 | 6/2018 | Sime | |
| 10,328,993 B2 | 6/2019 | Watt et al. | |
| 10,442,492 B2 | 10/2019 | Taylor | |
| 10,850,791 B2 | 12/2020 | D'Aluisio et al. | |
| 11,155,318 B2 | 10/2021 | Chong | |
| 11,292,550 B2 | 4/2022 | Brown, IV et al. | |
| 11,305,834 B2 * | 4/2022 | Brown, IV | B62K 21/18 |
| 2002/0139217 A1 | 10/2002 | Montague et al. | |
| 2015/0291246 A1 | 10/2015 | Achenbach et al. | |
| 2016/0185414 A1 | 6/2016 | Watt et al. | |

\* cited by examiner

*Primary Examiner* — Minnah L Seoh
*Assistant Examiner* — Hosam S Habara

(57) ABSTRACT

A non-uniform steerer tube. The non-uniform steerer tubes includes an axis-symmetric outer surface and a non axis-symmetric inner surface. The axis-symmetric outer surface and the non axis-symmetric inner surface defining a wall thickness therebetween. The wall thickness varying along an axial length of the non-uniform steerer tube.

5 Claims, 8 Drawing Sheets

NON-UNIFORM STEERER TUBE OR FORK LEG

CROSS-REFERENCE TO RELATED APPLICATIONS

This application is a Continuation of claims the benefit of and claims priority to the co-pending U.S. patent application Ser. No. 16/659,272, filed on Oct. 21, 2019, entitled "NON-UNIFORM STEERER TUBE OR FORK LEG" by William O. Brown, IV et al., assigned to the assignee of the present application, and is hereby incorporated by reference in its entirety.

This application claims the benefit of and claims priority to the U.S. Provisional Patent Application No. 62/751,929 filed on Oct. 29, 2018, entitled "NON-UNIFORM STEERER TUBE OR FORK LEG" by William O. Brown, IV et al., assigned to the assignee of the present application, and is hereby incorporated by reference in its entirety.

FIELD OF THE INVENTION

Embodiments of the present technology relate generally to a steerer tube and/or a fork leg.

BACKGROUND

Conventionally a steerer tube is coupled with a fork or other mechanism to enable a user to steer a vehicle such as, but not limited to, a bicycle, a motorcycle, and the like. More specifically, the steerer tube is typically coupled to handlebars using a stem. As a result, movement of the handlebars by a user results in rotation of the steerer tube. Further, as the steerer tube is also ultimately coupled to, typically, the front wheel, rotation of the steerer tube results in turning of the wheel (i.e., non-axial movement of the wheel). Hence, as the steerer is ultimately coupled to the front wheel and to the handlebars, the steerer tube can be subjected to significant forces, torques, vibrations, and the like. Similarly, the fork (or fork legs) of the vehicle can be subjected to significant forces, torques, vibrations, and the like.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

As stated above, in some vehicles, a steerer tube is ultimately coupled to a wheel of a vehicle. Similarly, in some vehicles, a fork leg of a fork is ultimately coupled to a vehicle. For purposes of brevity and clarity, the following discussion will refer to embodiments of the present invention corresponding to a steerer tube. It should be noted, however, that various embodiments of the present invention are well suited for use in an upper fork leg, a lower fork leg, or concurrently in both of the upper fork leg and the lower fork leg, or any combination of fork legs in conjunction also with use in a steerer tube. That said, for purposes of brevity and clarity only, and not to be interpreted as a limitation, the following discussion will refer to embodiments of the invention pertaining to a steerer tube.

Figure 1:
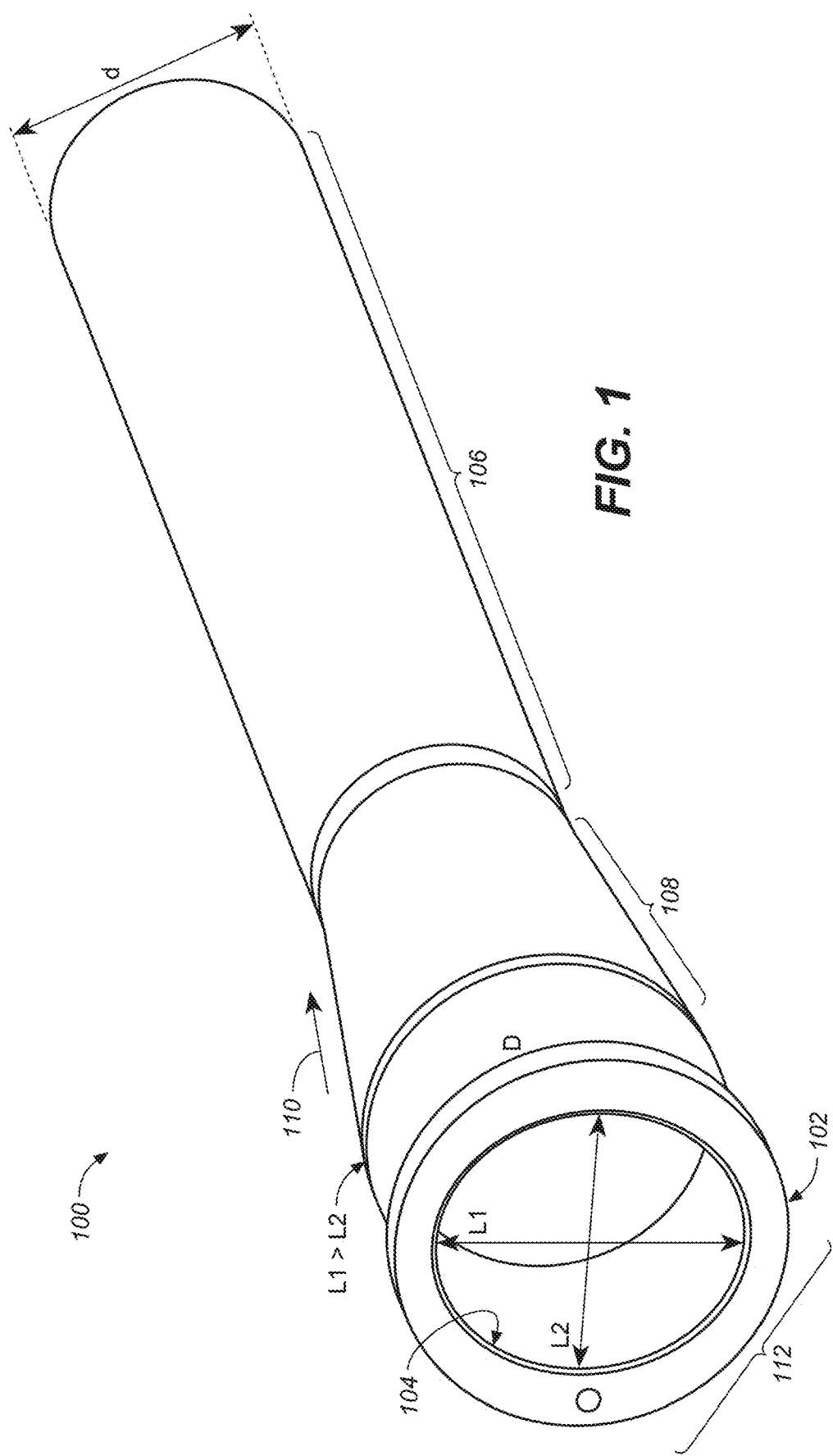
FIG. 1 is a perspective view of a non-uniform steerer tube, in accordance with an embodiment of the present invention.

As will be described in detail below, embodiments of the present invention provide a non-uniform steerer tube. Referring now to FIG. 1, a perspective view is shown of a non-uniform steerer tube 100 in accordance with one embodiment of the present invention. Referring still to FIG. 1, in the present embodiment, non-uniform steerer tube 100 includes an outer surface 102 (may also be referred to an outer diameter) and an inner surface 104 (may also be referred to as an inner diameter). In embodiments of the present invention, outer surface 102 is an axis-symmetric surface of revolution along the axial span (the "axial span" may also be referred to herein as an "axial length") of non-uniform steerer tube 100. That is, in various embodiments, outer surface 102 of non-uniform steerer tube 100 has a uniform diameter. More specifically, outer surface 102 has a uniform diameter length at any given location along the axial span of non-uniform steerer tube 100. It should be noted, however, that the uniform diameter length of outer surface 102 may be different at various locations along the axial span of non-uniform steerer tube 100. For example, it can be seen from FIG. 1, that the outer surface 102 of non-uniform steerer tube 100 has a uniform diameter length, d, along span length portion 106 of non-uniform steerer tube 100. It can further be seen from FIG. 1, that the outer surface 102 of non-uniform steerer tube 100 has a uniform diameter which gradually decreases from a uniform diameter length, D, to a uniform diameter length, d, along span length portion 108 of non-uniform steerer tube 100 in the direction shown by arrow 110.

With reference still to FIG. 1, in embodiments of the present invention, inner surface 104 is not an axis-symmetric surface of revolution along the entire axial span of non-uniform steerer tube 100. That is, in various embodiments, inner surface 104 of non-uniform steerer tube 100 has a non-uniform diameter at, at least, one location along the axial span of non-uniform steerer tube 100. Moreover, in embodiments of the present invention, inner surface 104 may have a non-uniform diameter length at any given location along the axial span of non-uniform steerer tube 100. Additionally, in embodiments of the present invention, inner surface 104 will have a non-uniform diameter length along the entire axial span of non-uniform steerer tube 100. Also, in embodiments of the present invention, inner surface 104 will have a non-uniform diameter length at multiple locations along the axial span of non-uniform steerer tube 100. Furthermore, it should be noted, that in embodiments of the present invention, inner surface 104 may have a uniform diameter length at, at least, one location along the axial span of non-uniform steerer tube 100.

Referring still to FIG. 1, it can be seen that at end 112 of non-uniform steerer tube 100, inner surface 104 has a non-uniform diameter. More specifically, at end 112 of non-uniform steerer tube 100, inner surface 104 has a non-uniform diameter which varies from a maximum length, L1, to a minimum length, L2.

Figure 2:
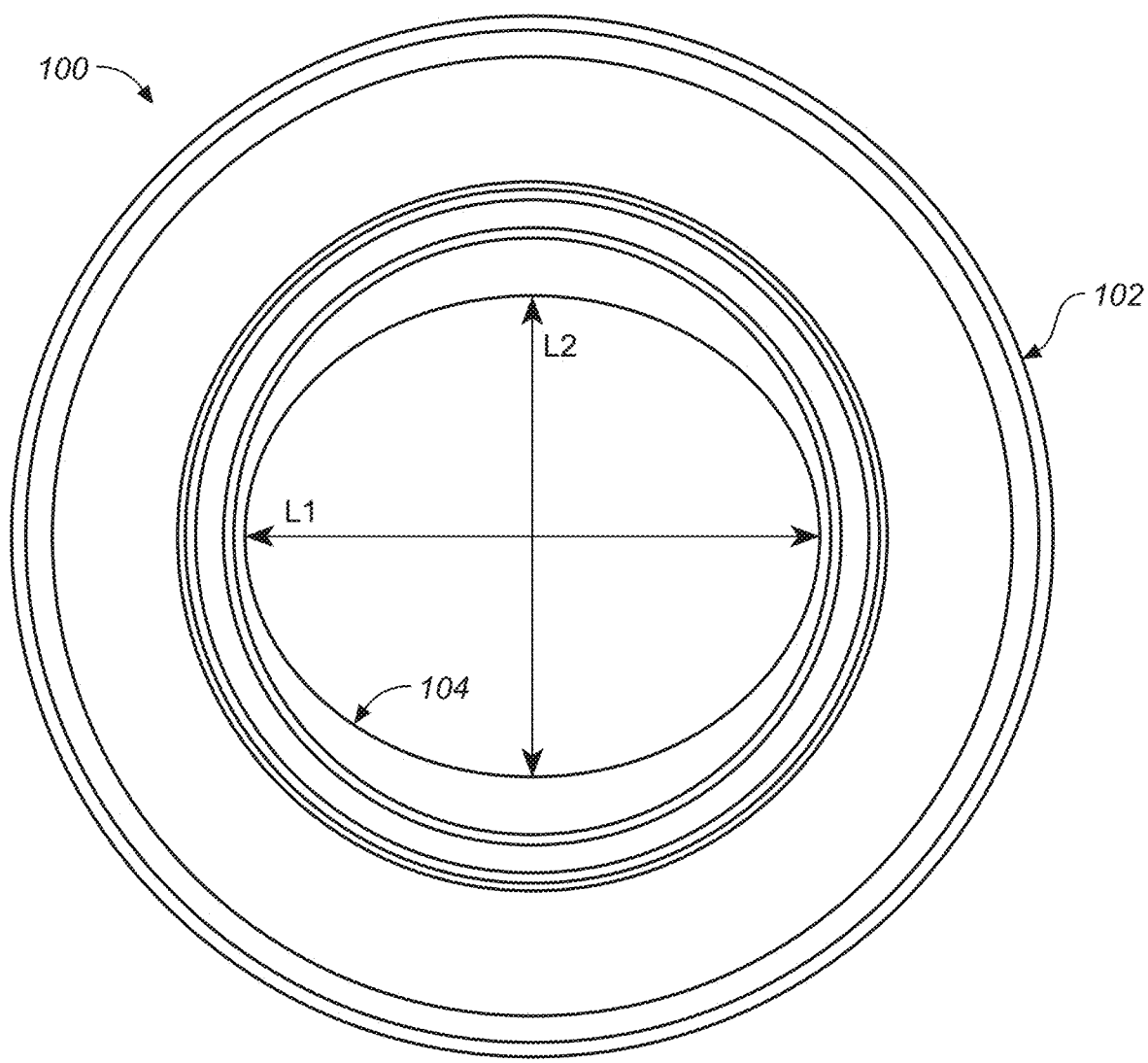
FIG. 2 is a cross-sectional view of the non-uniform steerer tube of FIG. 1, in accordance with an embodiment of the present invention.

Referring next to FIG. 2, a cross-sectional view of non-uniform steerer tube 100 of FIG. 1 is provided in accordance with an embodiment of the present invention. The cross-section of FIG. 2 is taken at, or near, end 112 of non-uniform steerer tube 100. FIG. 2 clearly shows that non-uniform steerer tube 100 has an inner surface 104 with a non-uniform diameter which varies from a maximum length, L1, to a minimum length, L2. Thus, it can be stated that, in various embodiments, non-uniform steerer tube 100 has a round outer profile but non-round inner profile at, at least, some location along the axial span of non-uniform steerer tube 100.

With reference still to FIG. 2, in embodiments of the present invention, non-uniform steerer tube 100 will have an inner surface 104 which is oval in shape. In other embodiments of the present invention, non-uniform steerer tube 100 will have an inner surface 104 which is egg-shaped. In other embodiments of the present invention, non-uniform steerer tube 100 will have an inner surface 104 which is elliptically-shaped. Additionally, in embodiments of the present invention, non-uniform steerer tube 100 will have an inner surface 104 which is rectangularly-shaped. In various embodiments in which non-uniform steerer tube 100 has an inner surface 104 which is rectangularly-shaped, some of the embodiments have sides of different thickness. Importantly, in embodiments of the present invention, regardless of the various examples of shapes and configurations described above, inner surface 104 of non-uniform steerer tube 100 has a non-uniform diameter at, at least, one location along the axial span of non-uniform steerer tube 100.

Figure 3:
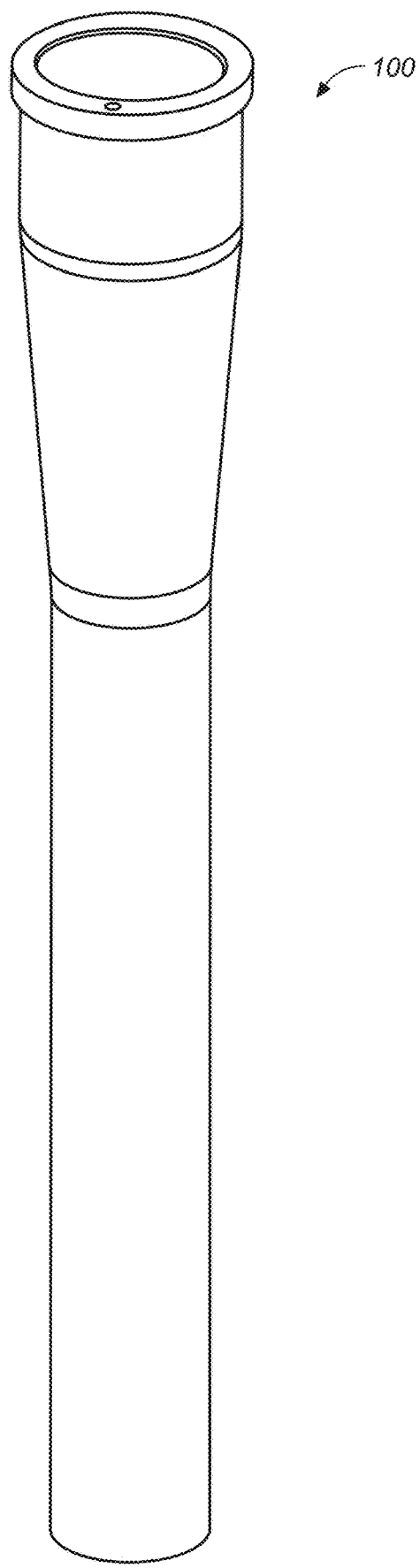
FIG. 3 is a perspective view of the non-uniform steerer tube of FIG. 1 taken from an angle different from that of FIG. 1, in accordance with an embodiment of the present invention.

FIG. 3 provides another perspective view of non-uniform steerer tube 100 taken from an angle different from that of FIG. 1.

Figure 4A:
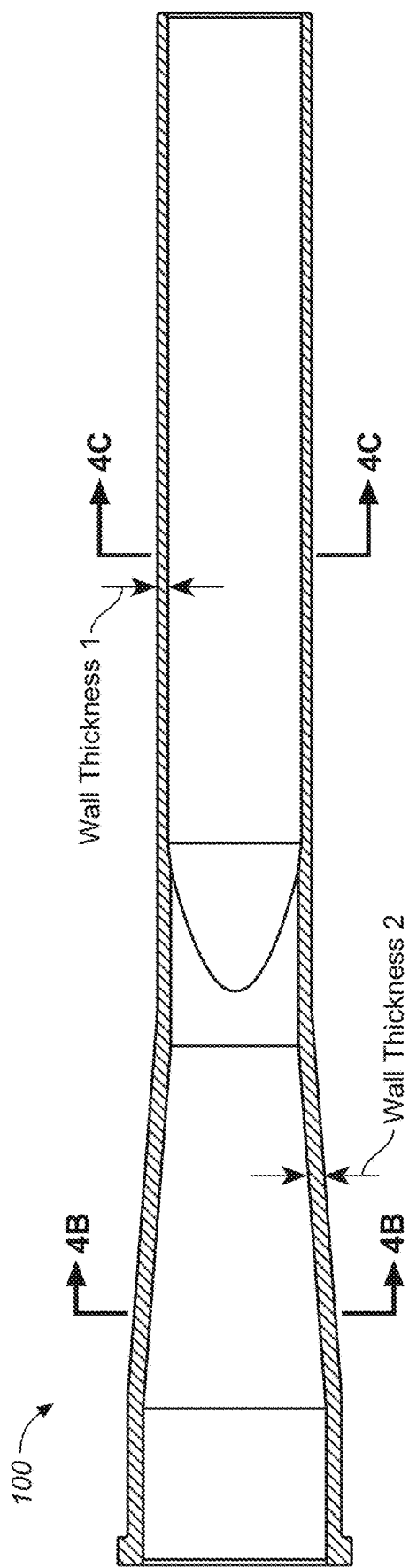
FIGS. 4A-4C are side-sectional views of one embodiment of a non-uniform steerer tube, in accordance with an embodiment of the present invention.
Figure 4B:
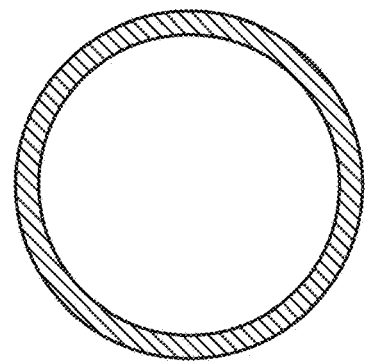
Figure 4C:

FIGS. 4A-4C are side-sectional views of one embodiment of non-uniform steerer tube 100, in accordance with an embodiment of the present invention. In the embodiment of FIGS. 4A-4C, inner surface 104 of non-uniform steerer tube 100 has a non-uniform diameter at section 2 along the axial span of non-uniform steerer tube 100. Further, in the embodiment of FIGS. 4A-4C, inner surface 104 of non-uniform steerer tube 100 has a uniform diameter at section 1 along the axial span of non-uniform steerer tube 100.

Figure 5A:
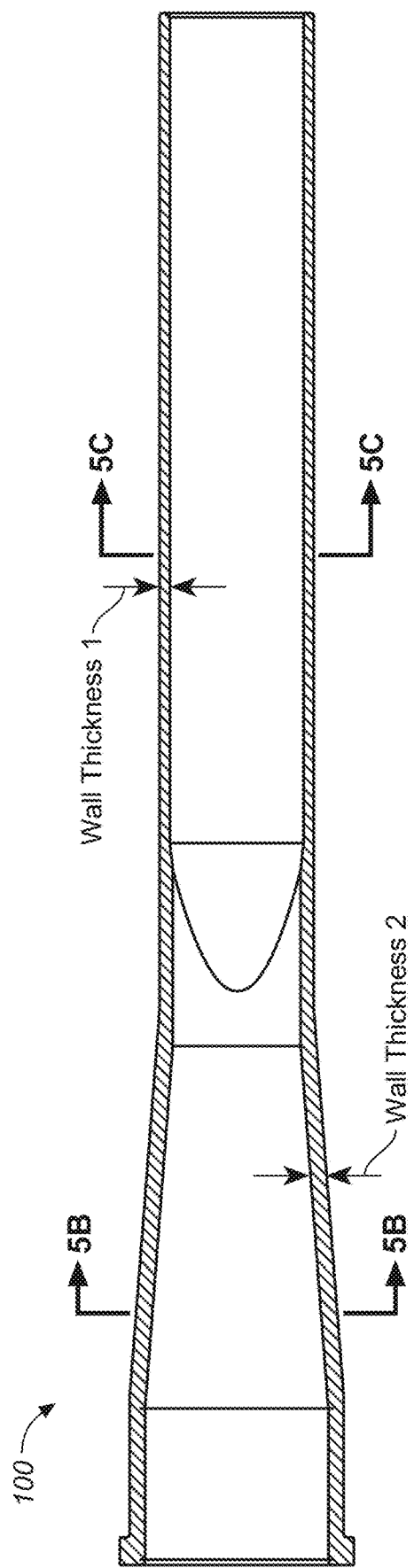
FIGS. 5A-5C are side-sectional views of another embodiment of a non-uniform steerer tube, in accordance with an embodiment of the present invention.
Figure 5C:
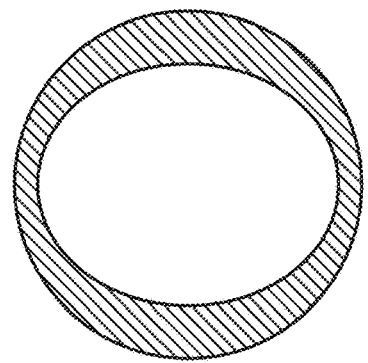
Figure 5B:
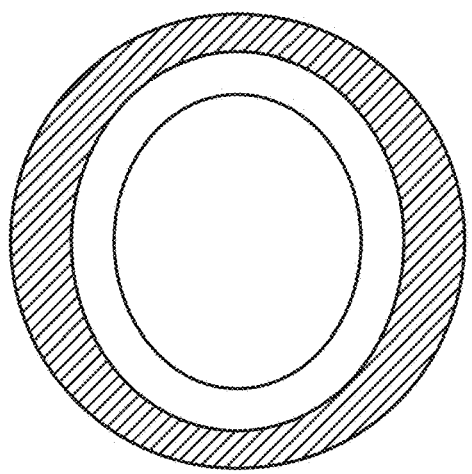

FIGS. 5A-5C are side-sectional views of another embodiment of non-uniform steerer tube 100, in accordance with an embodiment of the present invention. In the embodiment of FIGS. 5A-5C, inner surface 104 of non-uniform steerer tube 100 has a non-uniform diameter at section 2 along the axial span of non-uniform steerer tube 100. Further, in the embodiment of FIGS. 5A-5C, inner surface 104 of non-uniform steerer tube 100 also has a non-uniform diameter at section 1 along the axial span of non-uniform steerer tube 100.

Figure 6A:
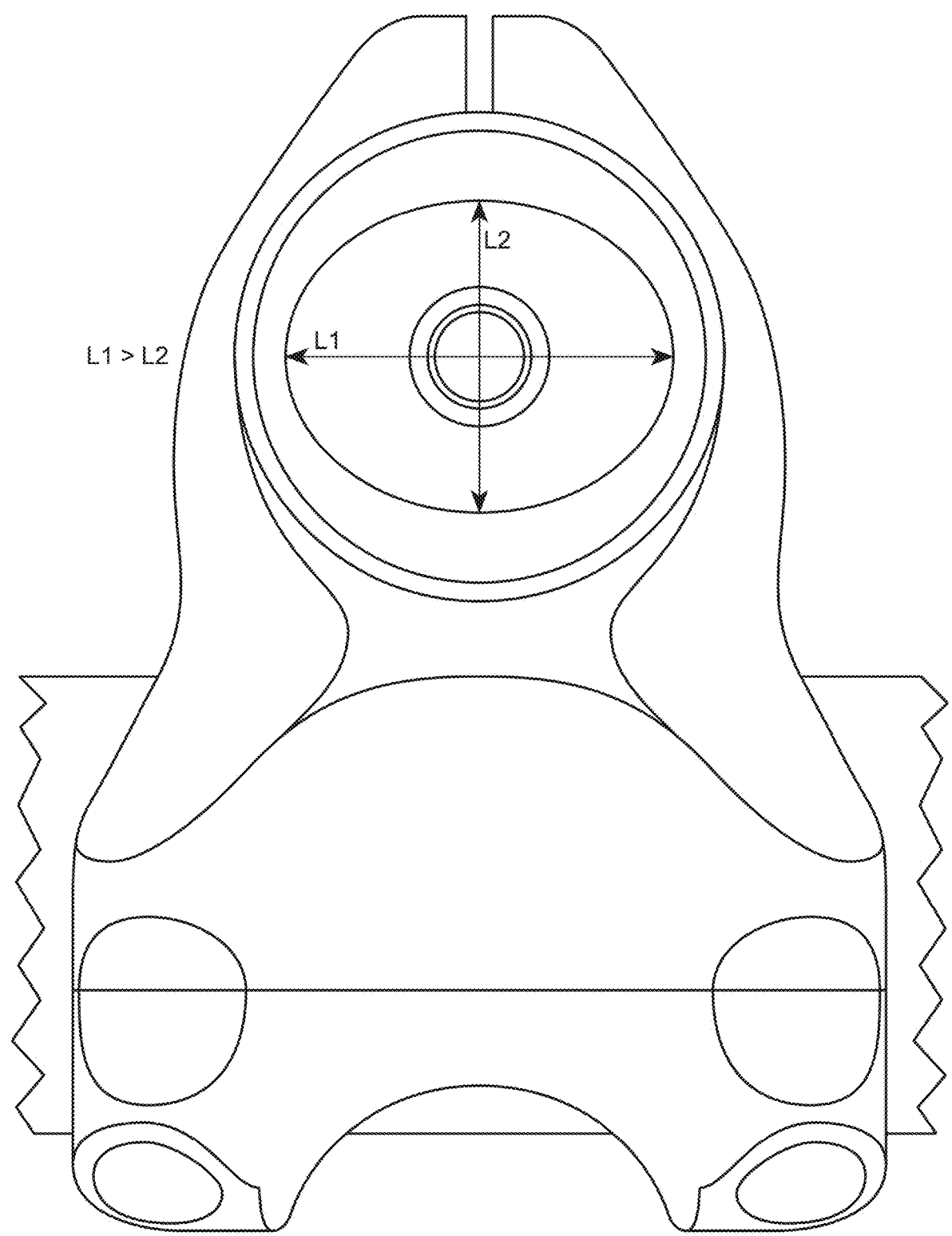
FIGS. 6A-6C are perspective views of a non-uniform steerer tube located on a bicycle, in accordance with an embodiment of the present invention.
Figure 6B:
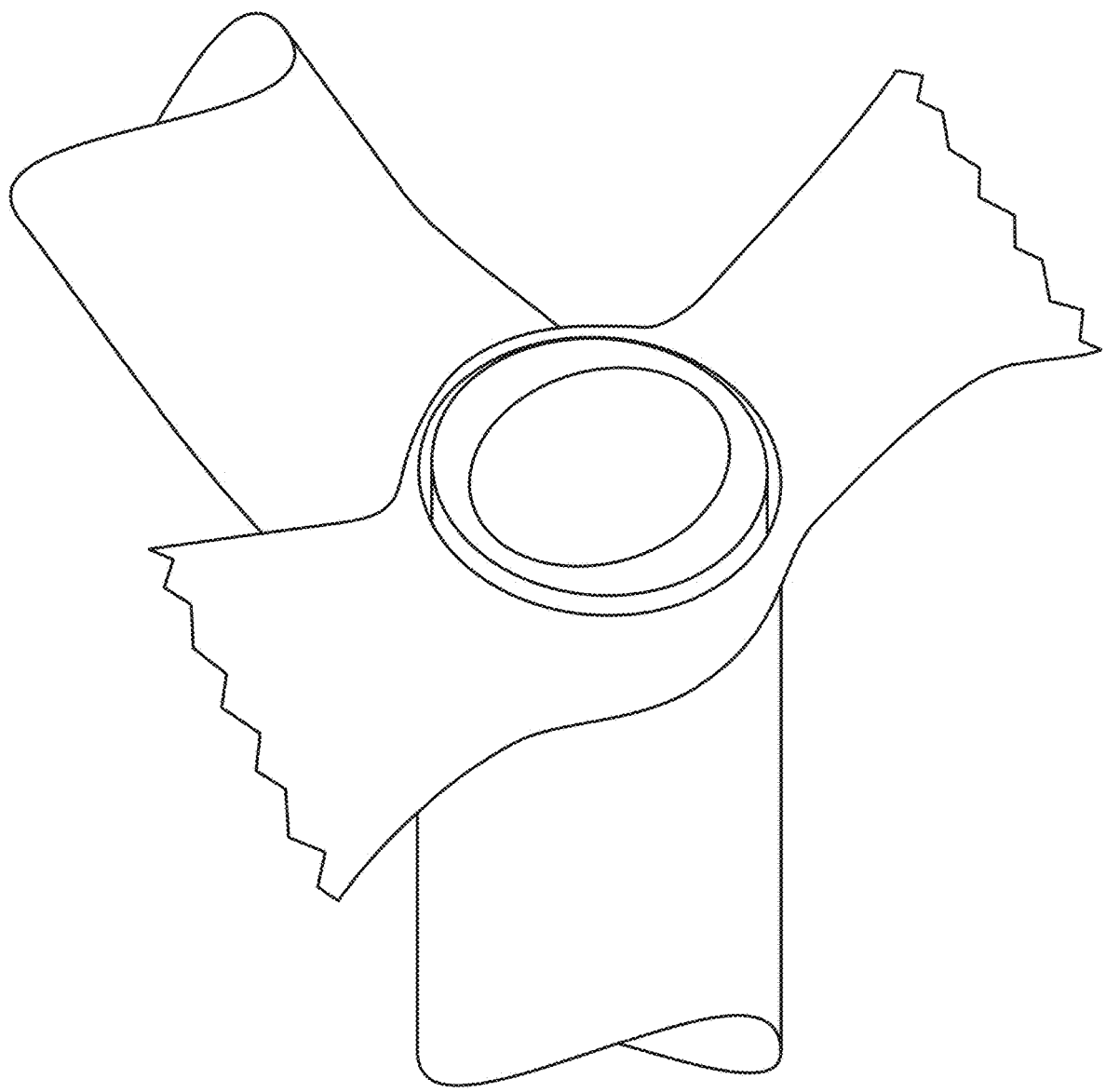
Figure 6C:
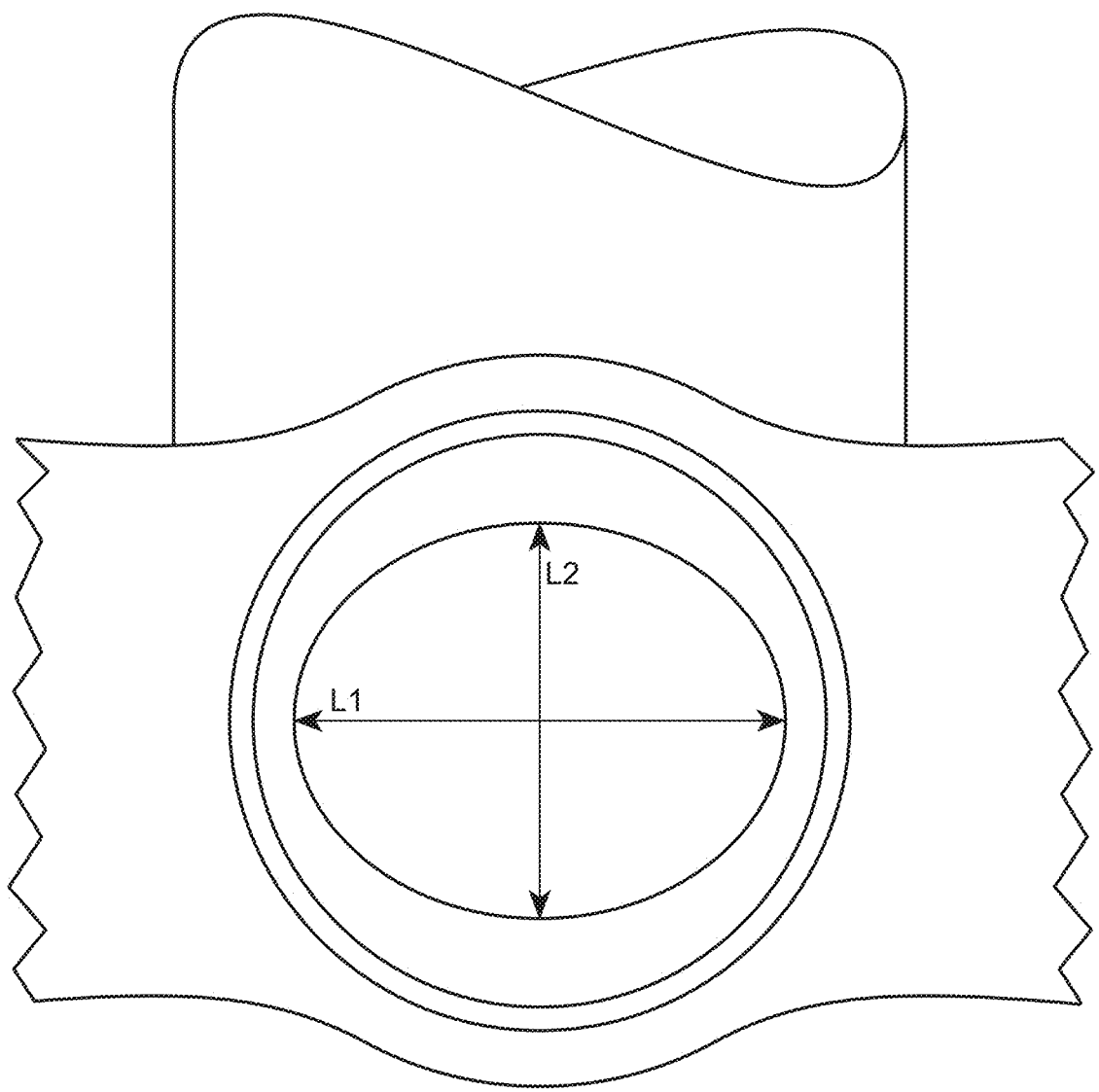

FIGS. 6A-6C are perspective views of a non-uniform steerer tube located on a bicycle, in accordance with an embodiment of the present invention.

In the various aforementioned embodiments of non-uniform steerer tube 100, the "non-uniformity" of the diameter of inner surface 104 is selected to provide additional support for non-uniform steerer tube 100 at locations thereof which are subjected to greater stress. If it is determined that a particular type of use is subjecting a steerer tube to a "fore and aft" force which is greater than a "side-to-side" force, embodiments of the present non-uniform steerer tube 100 will adjust the non-uniformity of the diameter of inner surface 104 to provide additional support with respect to the fore and aft force. Conversely, if it is determined that a particular type of use is subjecting a steerer tube to a "side-to-side" force which is greater than a "fore and aft" force, embodiments of the present non-uniform steerer tube 100 will adjust the non-uniformity of the diameter of inner surface 104 to provide additional support with respect to the side-to-side force.

In embodiments of the present invention, when used with a vehicle, non-uniform steerer tube 100 will be oriented such that the non-uniformity of the diameter of inner surface 104 provides additional support with respect to an anticipated load. For example, in one embodiment of the present invention, if it is anticipated that the vehicle will experience a fore and aft force/load, non-uniform steerer tube is oriented such that the non-uniformity of the diameter of inner surface 104 of non-uniform steerer tube 100 will provide additional support with respect to the fore and aft force.

As yet another example, in various embodiments of the present non-uniform steerer tube 100, the non-uniformity of the diameter of inner surface 104 is adjusted to provide additional support at the bottom of non-uniform steerer tube 100. As yet another example, in various embodiments of the present non-uniform steerer tube 100, the non-uniformity of the diameter of inner surface 104 is adjusted to provide additional support at the top of non-uniform steerer tube 100. As still another example, in various embodiments of the present non-uniform steerer tube 100, the non-uniformity of the diameter of inner surface 104 is adjusted to provide additional support at both the top and the bottom of non-uniform steerer tube 100.

Additionally, embodiments of the present non-uniform steerer tube 100 adjust the non-uniformity of the diameter of inner surface 104 in response to various frequencies imparted to non-uniform steerer tube 100. In one embodiment, non-uniform steerer tube 100 configures the non-uniformity of the diameter of inner surface 104 such that non-uniform steerer tube 100 reduces and/or changes fore and aft vibrational and/or resonant frequencies. In another embodiment, non-uniform steerer tube 100 configures the non-uniformity of the diameter of inner surface 104 such that non-uniform steerer tube 100 reduces and/or changes side-to-side vibrational and/or resonant frequencies. In still another embodiment, non-uniform steerer tube 100 configures the non-uniformity of the diameter of inner surface 104 such that non-uniform steerer tube 100 reduces and/or changes fore and aft and side-to-side vibrational and/or resonant frequencies.

As a result, embodiments of the present non-uniform steerer tube 100 are able to reduce and/or change the vibrations or other unwanted effects imparted to a vehicle rider based on the conditions that the vehicle and/or non-uniform steerer tube 100 is experiencing.

In various embodiments of the present invention, non-uniform steerer tube 100 "translates" the vibration that will be transferred to the handlebars. That is, by adjusting the non-uniformity of the diameter of inner surface 104, non-uniform steerer tube 100 alters the frequencies (makes the frequencies higher or lower) that are ultimately passed to the vehicle user (via, e.g., the handlebars). It should be further noted that in various embodiments, where it is desired to reduce the amplitude of a particular frequency, non-uniform steerer tube 100 reduces the vibration that will be transferred to the handlebars by adjusting the non-uniformity of the diameter of inner surface 104. Conversely, it should be further noted that in various embodiments, where it is desired to increase the amplitude of a particular frequency, non-uniform steerer tube 100 amplifies the vibration that will be transferred to the handlebars by adjusting the non-uniformity of the diameter of inner surface 104.

Although embodiments of the present non-uniform steerer tube explicitly describe adjusting the non-uniformity of the diameter of inner surface 104, various other embodiments of the present invention adjust the response and operation of the steerer tube by varying the material comprising at least a portion of the steerer tube. It should further be noted that the present invention also includes embodiments is which the non-uniformity of the diameter of inner surface 104 is adjusted, and the material comprising at least a portion of the non-uniform steered tube is varied.

In embodiments of the present invention, outer surface 102 remains circular (at each cross-section) along the span of non-uniform steerer tube 100. Such a configuration has several advantages associated therewith, besides the advantages described above. For example, because the outer surface of non-uniform steerer tube 100 is not altered (i.e., remains circular), non-uniform steerer tube 100 is still well suited to use with conventional bushings, gaskets, stems, and various other components. As a result, the beneficial non-uniform steerer tube 100 of the present embodiments, can still be offered as an industry standard product.

Furthermore, as yet another benefit, as outer surface 102 remains circular (at each cross-section) along the span of non-uniform steerer tube 100, an observer viewing only the outer surface of non-uniform steerer tube 100 would not be able to visually detect any difference between a conventional steerer tube and the present non-uniform steerer tube 100. Hence, the beneficial features of the present non-uniform steerer tube 100 are clandestine, and remain hidden to an observer viewing only the outer surface of non-uniform steerer tube 100 The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What we claim is:

1. A non-uniform steerer tube comprising:
an axis-symmetric outer surface; and
a non axis-symmetric inner surface, said axis-symmetric outer surface and said non axis-symmetric inner surface defining a wall thickness therebetween, said wall thickness varying along an axial length of said non-uniform steerer tube, said non axis-symmetric inner surface having a non-uniform diameter length at multiple locations along said axial length of said non-uniform steerer tube, said non-uniform steerer tube having a round outer profile and a non-round inner profile at, at least, one location along said axial length of said non-uniform steerer tube.

2. The non-uniform steerer tube of claim 1 wherein said non axis-symmetric inner surface has said non-uniform diameter length along said entire axial length of said non-uniform steerer tube.

3. The non-uniform steerer tube of claim 1 wherein said non axis-symmetric inner surface has a uniform diameter length at, at least, one location along said axial length of said non-uniform steerer tube.

4. The non-uniform steerer tube of claim 1 wherein said non axis-symmetric inner surface is configured to provide additional support for said non-uniform steerer tube at locations of said non-uniform steerer tube which are subjected to greater stress during use than other locations of said non-uniform steerer tube.

5. A non-uniform steerer tube comprising:
an axis-symmetric outer surface; and
a non axis-symmetric inner surface, said axis-symmetric outer surface and said non axis-symmetric inner surface defining a wall thickness therebetween, said wall thickness varying along an axial length of said non-uniform steerer tube, said non axis-symmetric inner surface having a non-uniform diameter length at multiple locations along said axial length of said non-uniform steerer tube, said non-uniform steerer tube having a round outer profile and a non-round inner profile at, at least, one location along said axial length of said non-uniform steerer tube, said axis-symmetric outer surface of said non-uniform steerer tube is circular along said axial length of said non-uniform steerer tube such that no visual differences are detectable between a conventional steerer tube and said non-uniform steerer tube.

* * * * *